United States Patent [19]

Pollard et al.

[11] 4,112,471
[45] Sep. 5, 1978

[54] DISK CARTRIDGE CONTAMINATION SHIELD

[75] Inventors: Christopher A. Pollard, Kinnesswood; David Stiven, Kirkcaldy, both of Scotland

[73] Assignee: Burroughs Corporation, Detroit, Mich.

[21] Appl. No.: 729,532

[22] Filed: Oct. 4, 1976

[30] Foreign Application Priority Data

Mar. 2, 1976 [GB] United Kingdom ................ 8218/76

[51] Int. Cl.² ..................... G11B 23/02; G11B 25/04; G11B 5/012
[52] U.S. Cl. ..................................... 360/98; 206/444; 360/133
[58] Field of Search ................................. 360/98–99, 360/102–103, 86, 97, 133, 135; 206/444; 346/137

[56] References Cited

U.S. PATENT DOCUMENTS

| 3,631,423 | 12/1971 | Groom | 360/97 |
| 3,720,931 | 3/1973 | Andersen | 360/98 |
| 3,731,291 | 5/1973 | Walsh | 360/98 |
| 3,800,325 | 3/1974 | O'Brien | 360/98 |
| 3,812,534 | 5/1974 | Rousseau et al. | 360/98 |
| 3,839,734 | 10/1974 | George et al. | 360/102 |

*Primary Examiner*—Alfred H. Eddleman
*Attorney, Agent, or Firm*—Gerald J. Woloson; Benjamin J. Barish; Kevin R. Peterson

[57] ABSTRACT

Apparatus for housing a rotatable disk used in an information storage apparatus having a disk as the memory storage member. The housing comprises a disk cartridge for holding the disk, the disk cartridge having an aperture which allows the transducer to access the disk, and further comprises a contamination shield interposed in the aperture for smoothing air flow through the aperture. In the absence of the shield, vortices of air form at the aperture which sweep air-borne contaminants into the cartridge and thereby expose the disk to contamination. The shield prevents the vortices from forming, thus eliminating a major cause of disk contamination.

10 Claims, 3 Drawing Figures

DISK CARTRIDGE CONTAMINATION SHIELD

BACKGROUND OF THE INVENTION

The invention relates generally to the field of computer disk memory systems, and more specifically to apparatus for housing memory disks and for reducing the exposure of disks to contamination.

DESCRIPTION OF THE PRIOR ART

Disks made of magnetizable material are widely used as high density data storage media for data processors. They have gained such acceptance because the information stored on such disk is rapidly and easily retrieved and for the added reason that the disks themselves may be quickly interchanged within a disk drive unit. Disks are often housed in cartridges, which are squat, generally cylindrical containers performing the diverse functions of storing the disks, and which protect the fragile disks from rough operator handling, facilitate the rapid and accurate positioning of the disk in the disk drive unit, and which also prevent the contamination of the disk surface by dust normally found in a work environment.

A disk drive unit generally provides means for receiving a disk and disk cartridge assembly, for rotating the disk, and for retrieving information from or recording information onto the disk. The unit also provides filtered air to the cartridge in an attempt to maintain a dust-free environment for the disks. A transducer, which performs the recording and retrieving roles, is supported in the disk drive unit on a cantilever mounting and accesses the disk, or is placed in a position juxtaposed the disk where it can record or retrieve information, through an aperture in the side of the cartridge. In this process, the aperture, which is normally covered by a resiliently hinged door, is exposed, thereby exposing the disk to contamination from dust and other air-borne contamination.

To achieve high record density and a high signal to noise ratio, the transducers in modern disk drive units are usually placed in close juxtaposition to the disk surface. One method by which this is done is by the use of an air bearing head, which is so shaped that air entrained by the rapidly rotating disk creates a cushion on which the head rests; the transducer in effect flies. The flying reliability of the head is obviously affected by convolutions in the disk surface and also by contamination thereof. It is evident, therefore, that removal of dust from a contaminated disk and particularly the prevention of contamination at the outset, are quite important.

The filtered air is supplied to the cartridge by the disk drive unit also in an attempt to reduce and remove contamination. However, the positive air pressure inside the cartridge with respect to outside, which forces air through the opening, coupled with the rapid rotation of the disk, with which the filtered air becomes partially entrained causes turbulence to form at the opening. The turbulence takes the form of vortices which sweep contaminants into the disk cartridge.

Heretofore several systems have been devised in an attempt to reduce, prevent or remove contamination. In U.S. Pat. No. 3,812,534, issued on May 5, 1974, to Rousseau et al, a system of brushes and air vents is disclosed for removing contamination from and preventing contamination of the disk. U.S. Pat. No. 3,839,734, issued on Oct. 1, 1974, to George et al, discloses a system of vanes for deflecting air entrained with the rotating disk, creating turbulence at the disk surface to remove dust therefrom. These systems do not, however, prevent the formation of the air vortices referred to above, nor do they prevent the vortices from sweeping contaminants into the cartridge. The hereindisclosed invention provides an improved housing which prevents the formation of the air vortices, thereby significantly reducing the likelihood of contamination by dust that would be entrained thereby.

SUMMARY OF THE INVENTION

The invention disclosed herein comprises an improvement in which the herein-described vortices of air are eliminated, thus eliminating a substantial cause of disk contamination. The disk cartridge is provided with a shield interposed in the access opening, which shield prohibits formation of the vortices, and, hence, the contamination of the disk by contaminants that would be entrained thereby.

It is therefore an object of this invention to provide apparatus for reducing contamination of a magnetic disk.

It is a further object to provide apparatus for reducing contamination of a magnetic memory disk by airborne contaminants.

It is another object to provide apparatus for eliminating vortices of air at the access opening of the disk cartridge.

It is still another object to provide apparatus for improving operation of a computer disk memory by reducing contamination of the disk.

BRIEF DESCRIPTION OF THE DRAWINGS

The invention will be better understood upon consideration of the following detailed description when read in conjunction with the drawings, in which.

DETAILED DESCRIPTION OF THE PREFERRED EMBODIMENT

With reference to the above-listed figures, the preferred embodiment of the invention will now be described.

An example of a disk cartridge with which the contamination shield may be used is disclosed in U.S. Pat. No. 3,526,884, issued to Buslik et al, on Sept. 1, 1970. The cartridge has a squat, cylindrical shape with circular top and bottom sides. An opening in the cylindrical side allows a read/write transducer to enter the cartridge and access the disk, that is, attain a position juxtaposed the disk wherefrom reading from and writing onto the disk can be accomplished. The opening is normally covered by a door resiliently hinged on the top. Means are provided to allow filtered air to enter the cartridge while the access door is open because the disk drive unit is not maintained as a dustfree environment. Means are also provided to permit rotation of the disk within the disk cartridge by the disk drive unit.

Figure 2:
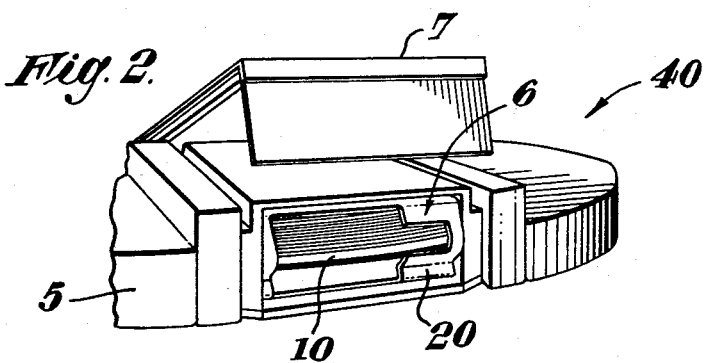
FIG. 2 is a perspective view of a shield positioned in the access door of a disk cartridge.
Figure 3:
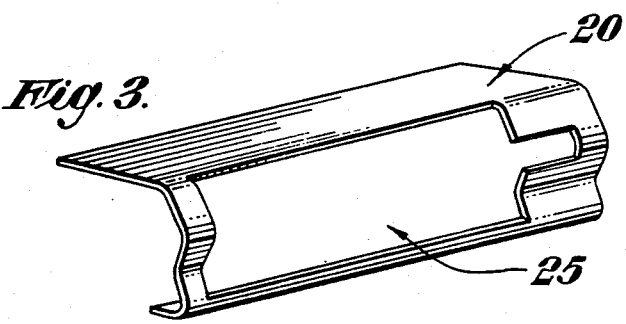
FIG. 3 is a perspective view of a contamination shield.

Referring to FIGS. 2 and 3, the inventive structure disclosed herein is an improved disk housing 40 comprising a disk cartridge 5 in combination with a contamination shield 20 for reducing the flow of air and airborne contaminants through the access aperture, which flow would occur in the absence of the shield while the door is open and the disk is being accessed. The shield 20 comprises a thin piece of plastic or other suitable material appropriately shaped so as to be positionable in access aperture 6 in disk cartridge 5. Shield 20 itself has a small aperture 25 which allows the disk to be accessed. Small aperture 25 is formed of a size barely sufficient to permit the transducer and supports therefor to enter housing 40 and access the disk 10. The shape of shield 20 conforms generally to the shape of the cartridge 5 with which it is used, presenting no obstacle to disk rotation inside housing 40 or to the closure of access door 7 when the disk is to be placed in storage. This allows the shield 20 to remain with the housing at all times and act as a secondary safeguard against contamination should access door 7 accidentally open while the housing is in storage or otherwise being handled.

Figure 1:
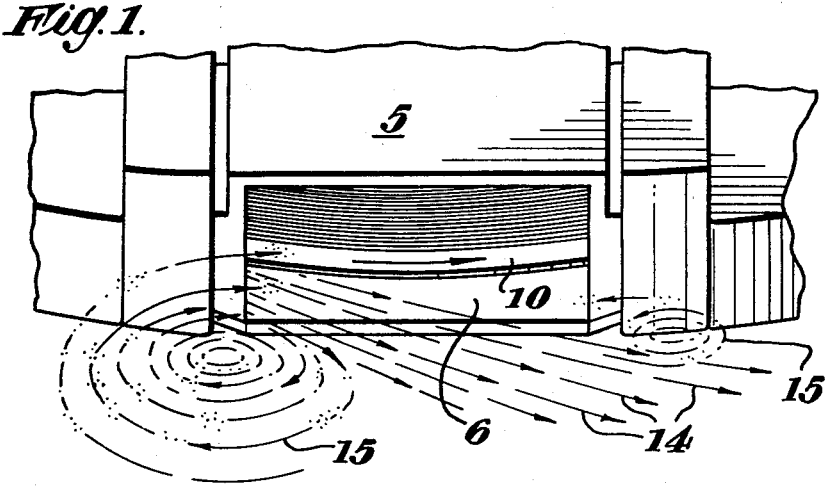
FIG. 1 is a top view of the disk cartridge aperture, showing the vortices of air created there.

The shield 20, in combination with the disk cartridge 5, performs several significant functions. One such function is apparent, as interposition of the shield 20 in access aperture 6 results in a significant reduction in housing surface area that would otherwise be open to expose the disk to contamination. Furthermore, as shown in FIG. 1, without the shield, the combination of the positive air pressure maintained within the cartridge 5 by the flow of filtered air supplied thereto, and the rapid rotation of disk 10, which influences the flow of air in the cartridge, causes vortices 15 to form at the access aperture when the access door is open. The vortices 15 sweep air and, hence, contaminants into the cartridge from the outside through the cartridge aperture. Interposition of the shield 20 in this aperture smooths the flow of air 14 therethrough, reducing turbulence at the opening, and thereby eliminating vortices 15 and a major source of disk contamination.

It will occur to those skilled in the art that various modifications may be made in the above-described preferred embodiment without departing from the spirit of the invention. It is expressly understood that the scope of the invention is not limited to the embodiment disclosed herein, but only as indicated in the appended claims.

What is claimed is:

1. In an information storage apparatus having a rotatable memory disk and a disk drive unit including a transducer, a housing positionable within the apparatus comprising:
   (a) a disk cartridge containing a disk, said disk cartridge having an aperture formed therein to permit the transducer to be juxtaposed to said disk, said aperture allowing air-borne contaminants to flow freely therethrough when the transducer is in juxtaposition to said disk, and
   (b) means supported by said disk cartridge for substantially reducing the flow of air-borne contaminants through said aperture when said transducer is in juxtaposition to said disk,
   said means having a contoured first transverse edge-surface and a contoured-and-slotted second transverse edge-surface,
   where both of the contours are shaped so that the surfaces radially straddle the disk circumference, with the top and bottom ends of the surfaces located radially closer than the midpoints of the surfaces to the disk axis, and
   where the slot enables the second transverse edge-surface to cross-circumferentially, as well as radially, straddle the disk circumference, with the aperture-end of the surface located radially closer than the cartridge-end of the surface to the disk axis.

2. A housing as defined in claim 1 wherein:
the above-disk and below-disk sections of said radially-straddling contoured surfaces are symmetrical with respect to the disk circumference.

3. A housing as defined in claim 2 wherein:
said first transverse edge-surface is located at the up-wind side of the aperture and said second transverse edge-surface, with its slot, is located at the down-wind side of the aperture.

4. A housing as defined in claim 3 in which said flow reduction means comprises a shield fitted into said disk cartridge aperture.

5. A housing defined as in claim 4 in which said disk cartridge has a closure which covers the aperture when said disk cartridge is not in said disk drive unit, and said shield is contoured to allow said closure to prevent access to said aperture with said shield fitted into said aperture.

6. In an information storage apparatus having a disk drive unit, a transducer supported therein, and a disk cartridge positionable in said disk drive unit containing a memory disk, said disk cartridge having an aperture formed therein to permit the transducer to juxtapose said disk, said aperture permitting air-borne contaminants to flow freely therethrough when the transducer is in juxtaposition to said disk, said disk cartridge also having a closure which covers the aperture when said disk cartridge is not in said disk drive unit, a shield comprising:
   a member supported by said disk cartridge, which member substantially reduces the flow of air-borne contaminants through said aperture when said transducer is in juxtaposition with said disk,
   said member having a contoured first transverse edge-surface and a contoured-and-slotted second transverse edge surface,
   where both of the contours are shaped so that the surfaces radially straddle the disk circumference, with the top and bottom ends of the surfaces located radially closer than the midpoints of the surfaces to the disk axis, and
   where the slot enables the second transverse edge-surface to cross-circumferentially, as well as radially, straddle the disk circumference, with the aperture-end of the surface located radially closer than the cartridge-end of the surface to the disk axis.

7. The structure as defined in claim 6 wherein:
the above-disk and below-disk sections of said radially-straddling contoured surfaces are symmetrical with respect to the disk circumference.

8. The structure as defined in claim 7 wherein:
said first transverse edge-surface is located at the up-wind side of the aperture and said second transverse edge-surface, with its slot, is located at the down-wind side of the aperture.

9. The structure as defined in claim 8 in which said shield comprises a positionable member which may be fitted into said disk cartridge aperture.

10. The structure as defined in claim 9 in which said positionable member is also contoured so as to allow said closure to close over said positionable member so as to prevent access to said aperture.

* * * * *